US010037279B1

(12) United States Patent
Bigman et al.

(10) Patent No.: US 10,037,279 B1
(45) Date of Patent: Jul. 31, 2018

(54) HOST DEVICE CACHING OF A BUSINESS PROCESS DATA

(75) Inventors: Ron Bigman, Holon (IL); Nir Sela, Tzur Igal (IL); Adi Hirschtein, Givataim (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 191 days.

(21) Appl. No.: 13/527,761

(22) Filed: Jun. 20, 2012

(51) Int. Cl.
G06F 12/00 (2006.01)
G06F 12/0846 (2016.01)
G06F 12/0891 (2016.01)
G06F 12/0888 (2016.01)

(52) U.S. Cl.
CPC ...... *G06F 12/0848* (2013.01); *G06F 12/0888* (2013.01); *G06F 12/0891* (2013.01); *G06F 2212/28* (2013.01); *G06F 2212/45* (2013.01); *G06F 2212/60* (2013.01)

(58) Field of Classification Search
CPC ............. G06F 12/0848; G06F 12/0888; G06F 12/0893; G06F 2212/28; G06F 2212/45; G06F 2212/60; G06F 2212/282; G06F 12/0891
USPC ........ 711/114, 129, 147, 170, 173, E12.002, 711/E12.009
See application file for complete search history.

(56) References Cited

U.S. PATENT DOCUMENTS

| | | | |
|---|---|---|---|
| 6,421,761 B1 * | 7/2002 | Arimilli et al. | 711/128 |
| 6,728,840 B1 * | 4/2004 | Shatil et al. | 711/137 |
| 7,039,765 B1 * | 5/2006 | Wilkes | 711/133 |
| 7,856,530 B1 * | 12/2010 | Mu | 711/119 |
| 7,895,398 B2 * | 2/2011 | Shet et al. | 711/129 |
| 2001/0034822 A1 * | 10/2001 | Weinreb et al. | 711/203 |
| 2005/0278501 A1 * | 12/2005 | Taguchi | G06F 12/0866 711/203 |
| 2006/0184740 A1 * | 8/2006 | Ishikawa | G06F 12/084 711/129 |
| 2006/0248297 A1 * | 11/2006 | Watanabe | G06F 3/0611 711/162 |
| 2007/0174551 A1 * | 7/2007 | Cornwell et al. | 711/118 |
| 2007/0214320 A1 * | 9/2007 | Ruia et al. | 711/119 |
| 2008/0244183 A1 * | 10/2008 | Ishikawa et al. | 711/129 |

(Continued)

OTHER PUBLICATIONS

Guillermo et al , "MINERVA: An Automated Resource Provisioning Tool for Large-Scale Storage Systems", Nov. 2001, Hewlett-Packard Laboratories, ACM Transactions on Computer Systems, vol. 19, No. 4, Nov. 2001, pp. 483-518.*

*Primary Examiner* — Matthew Bradley
(74) *Attorney, Agent, or Firm* — Anderson Gorecki LLP

(57) ABSTRACT

A data storage subsystem includes a data storage array and a host device in communication with the data storage array. Applications on servers and user terminals communicate with the host to access data maintained by the storage array. In order to enhance performance, the host includes a cache resource and a computer program including cache configuration logic which determines whether an IO received from an application is associated with a predetermined type of business process, and configures the cache resource to store data associated with the received IO where it is determined that the IO is associated with the predetermined type of business process, thereby enabling the data to be available directly from the host without accessing the storage subsystem in response to a subsequent Read request.

24 Claims, 6 Drawing Sheets

(56) References Cited

U.S. PATENT DOCUMENTS

| | | | |
|---|---|---|---|
| 2009/0037608 A1* | 2/2009 | Lubbers et al. | 710/5 |
| 2009/0182836 A1* | 7/2009 | Aviles et al. | 709/213 |
| 2009/0182940 A1* | 7/2009 | Matsuda | G06F 12/0813 711/114 |
| 2009/0235269 A1* | 9/2009 | Nakajima et al. | 718/104 |
| 2011/0119228 A1* | 5/2011 | Menze et al. | 707/607 |
| 2011/0238634 A1* | 9/2011 | Kobara | 707/692 |

\* cited by examiner

US 10,037,279 B1

HOST DEVICE CACHING OF A BUSINESS PROCESS DATA

CROSS-REFERENCE TO RELATED APPLICATIONS

NA

BACKGROUND OF THE INVENTION

The invention is generally related to data storage subsystems which are accessed via a network, and more particularly to a storage host device which improves performance of the data storage subsystem.

Enterprise data storage subsystems are used to maintain relatively large data sets. A data storage subsystem includes at least one enterprise storage array which is accessed via a host device. Technologies such as RAID and remote site mirroring may be used to help avoid data loss. Further, tiered levels of storage may be utilized in order to help provide both high performance and high capacity at a practical cost. Applications generally access data in a storage array by sending IOs to the host device. The host device then communicates with the storage array to Read or Write data. Features which enhance performance of a data storage subsystem without unjustifiable added cost are generally desirable.

SUMMARY OF THE INVENTION

In accordance with an aspect, a method comprises: monitoring a host device associated with a storage array of a storage subsystem to determine whether an IO received from an application is associated with a predetermined type of business process; and configuring a cache resource of the host device to store data associated with the received IO where it is determined that the IO is associated with the predetermined type of business process, thereby enabling the data to be available directly from the host without accessing the storage subsystem in response to a subsequent Read request.

In accordance with another aspect, a computer program stored on a non-transitory computer readable medium comprises: logic which monitors a host device associated with a storage array of a storage subsystem to determine whether an IO received from an application is associated with a predetermined type of business process; and logic which configures a cache resource of the host device to store data associated with the received IO where it is determined that the IO is associated with the predetermined type of business process, thereby enabling the data to be available directly from the host without accessing the storage subsystem in response to a subsequent Read request.

In accordance with another aspect, an apparatus comprises: a data storage array; and a host device in communication with the data storage array, the host device including a cache resource and a computer program stored on a non-transitory computer readable medium including logic which determines whether an IO received from an application is associated with a predetermined type of business process, and logic which configures the cache resource to store data associated with the received IO where it is determined that the IO is associated with the predetermined type of business process, thereby enabling the data to be available directly from the host without accessing the storage subsystem in response to a subsequent Read request.

One advantage associated with aspects is that throughput can be increased, and latency reduced, by copying at least some data to the cache of the host device. Further, only selected data is copied to the cache. For example, the host can be configured such that only data associated with particular business processes or types of business processes is copied to cache. This can be accomplished in at least some cases by attaching and detaching selected logical volumes maintained by the host. Business process priority indicators can also be used to determine which data to copy to the cache and whether to assign a partition of the cache.

Other features and advantages will become apparent in view of the detailed description and figures.

DETAILED DESCRIPTION

Certain aspects of the invention including but not limited to steps shown in flow diagrams may be implemented at least in-part with a computer program stored on non-transitory memory and utilized by a processor. The computer program may be distributed among multiple devices or operate on a single device.

Figure 1:
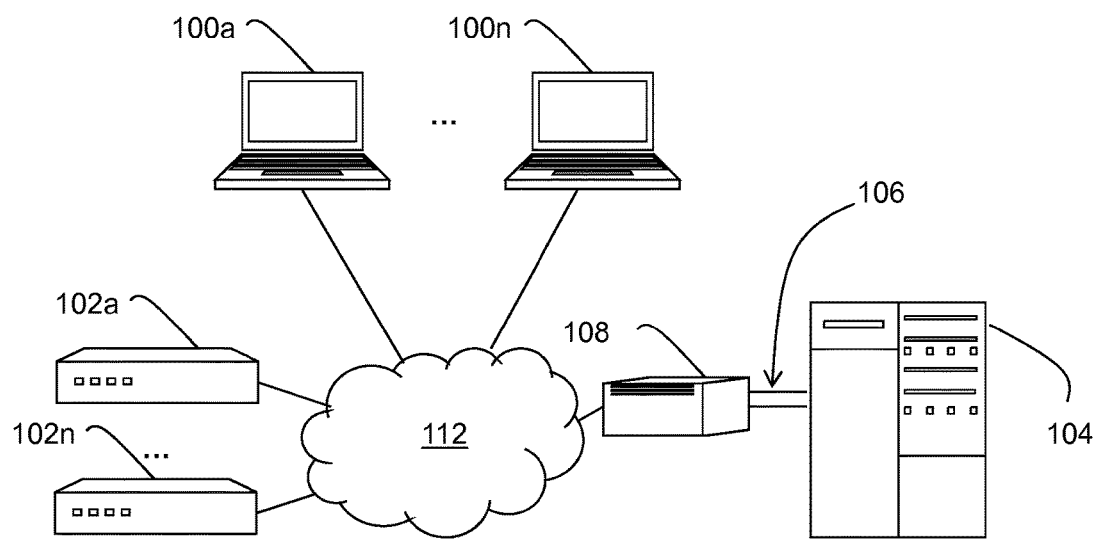
FIG. 1 illustrates a simplified enterprise network environment.

FIG. 1 illustrates a simplified network environment in which applications running on devices such as user terminals $100a$ through $100n$ (including but not limited to personal computing devices of any kind) and servers $102a$ through $102n$ (including but not limited to computing devices of any kind which perform tasks for other devices) utilize data maintained by the data storage resources of a data storage subsystem. The data storage subsystem includes an enterprise storage array 104, such as the Symmetrix system of EMC corporation, and a host device 108, which may be a type of server.

Figure 2:
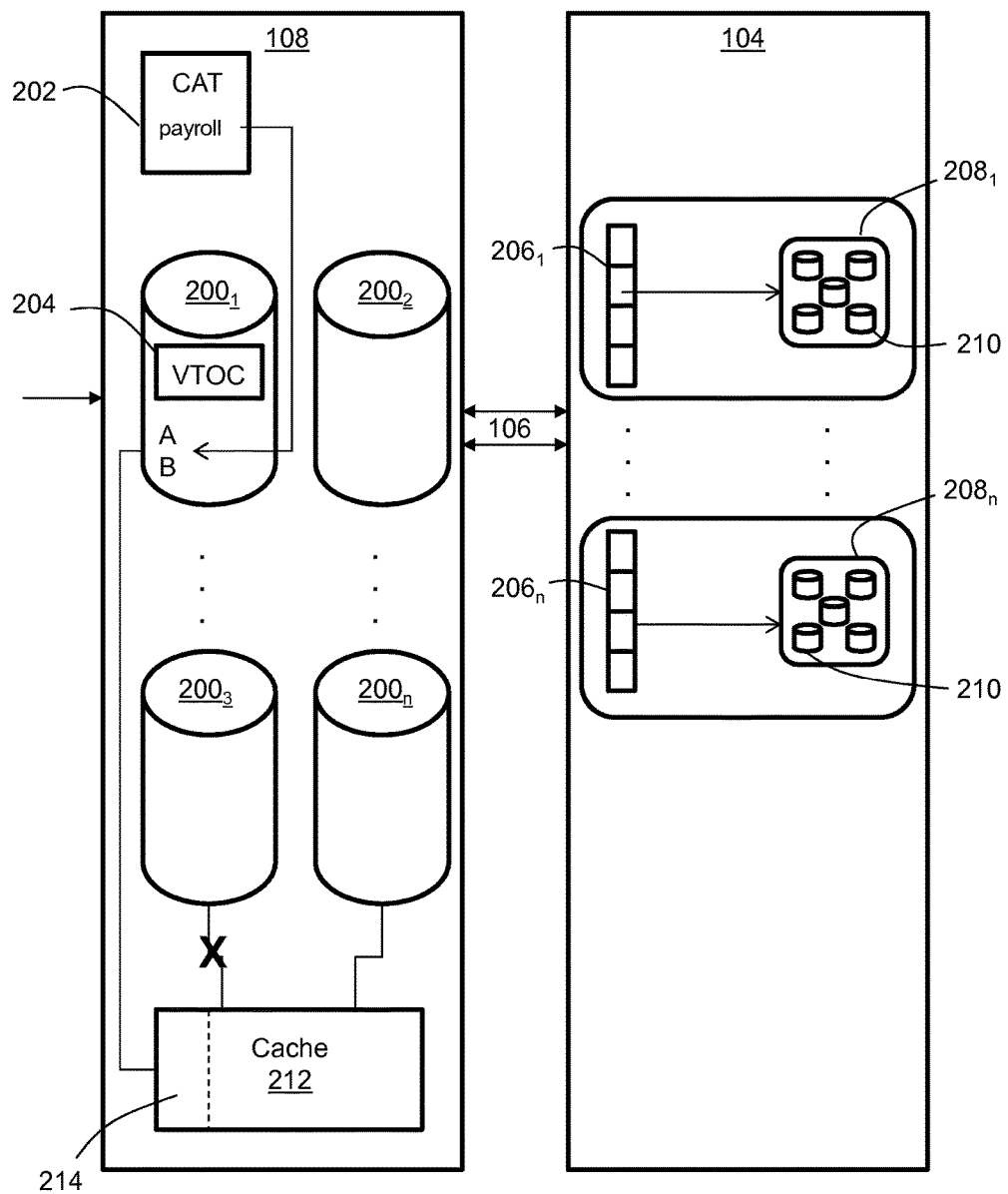
FIG. 2 illustrates a data storage subsystem.

Referring to FIG. 2, the host device 108 includes a plurality of logical volumes $200_1$ through $200_n$. A catalog 202 maintains pointers to data stored on the logical volumes. For example, a catalog entry might indicate that a file "payroll" is located on volume $200_1$ at address range A-B. Each logical volume includes a volume table of contents (VTOC) 204 which indicates a corresponding cylinder and track at which the file is located from the perspective of the host device. However, the actual data is stored by physical storage devices associated with the storage array 104 at locations which may not be known by the host, e.g., at locations other than those specified by the VTOC.

The storage array 104 may be thinly provisioned such that the apparent storage capacity does not necessarily match the actual storage capacity. The thinly provisioned storage array includes pointer tables $206_1$ through $206_n$ associated with storage pools $208_1$ through $208_n$ of logical volumes 210 which are associated with physical storage devices (not illustrated). In response to an IO such as a READ or WRITE from the host 108 which indicates a location from a VTOC, the storage array 104 looks for a pointer entry in the table, e.g., $206_1$, associated with the address indicated by the IO. The pointer indicates a corresponding address for the data in a data pool, e.g., $208_1$. The READ or WRITE is then performed. If the IO is a WRITE and no pointer is found, storage space is allocated in a data pool and a new pointer entry is made in the table pointing to the allocated space.

The storage pools $208_1$ through $208_n$ may be organized into different hierarchical tiers. Different physical storage devices have different performance characteristics. Each tier is associated with a particular type of physical storage device. For example, the physical storage devices may include high-speed flash (EFD) arrays at tier 0, Fibre Channel arrays at tier 1, and SATA arrays at tier 2. Tier 0 is used to store extents or sub-extents which are expected to be the most frequently used (hot). In particular, the highest ranked extents or sub-extents of storage in terms of expected use up to the capacity of tier 0 are selected for storage at tier 0. Extents or sub-extents of storage which are expected to be less frequently used than hot extents or sub-extents (warm) are stored at tier 1. In particular, the next highest group ranked extents or sub-extents in terms of expected use up to the capacity of tier 1 are selected for storage at tier 1. The remaining extents or sub-extents are stored at tier 2. Expected activity level tends to change over time so data is moved between slower storage devices and faster storage devices based on updates to expected activity. For example, extents or sub-extents which are expected to be frequently accessed are stored on relatively faster devices, but may be moved to relatively slower devices when the extents or sub-extents are not expected to be accessed for a predetermined period of time.

Referring again to FIGS. 1 and 2, the host device 108 generally responds to IOs transmitted from the user terminals and servers via network 112 by accessing the storage array 104 via a high speed point-to-point link 106. For example, an JO request such as a Read or Write from a device such as server 102*a* is sent to host 108 via network 112, thereby causing the host 108 to prompt performance of the IO by causing data to be written to the storage array 104 in response to a Write or causing data to be sent to the host from the storage array in response to a Read. Data sent to the host in response to a Read is subsequently sent to the requesting device, e.g., server 102*a*.

In order to reduce latency and increase throughput the host device 108 includes a physical storage resource (cache 212) for supporting IOs. The cache may include flash memory or other types of EEPROMs and RAM. The cache is used to temporarily store data that is maintained by the storage array such that an IO can be more quickly satisfied, e.g., accessed directly by the host from cache without involvement of the storage array. For example, a data set may be initially read from the storage array in response to a request by an application running on a server or user terminal and, when retrieved by the host, written to the cache so that the data can be drawn from the cache in response to a subsequent IO the data. Generally, data that has not been accessed recently or within a predetermined period of time may be flushed from the cache to free space for new data. Alternatively, or additionally, the oldest or least recently accessed data in the cache may be overwritten by new data.

Figure 3:
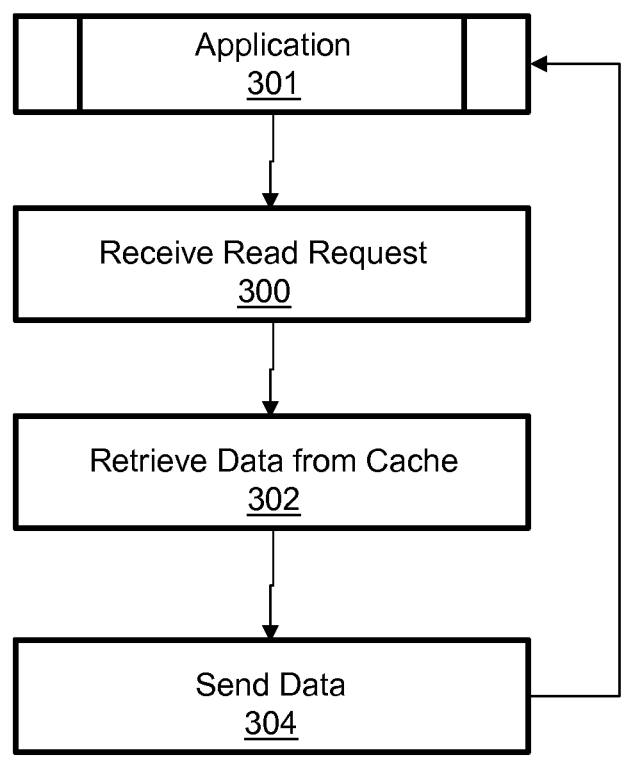
FIG. 3 illustrates a Read Hit with host cache.

FIG. 3 illustrates a host cache Read Hit with reference to the infrastructure of FIGS. 1 and 2. A Read request from an application 301 is received at the host device at 300. A cache driver determines a Read Hit has occurred and accesses data from the cache at 302. The data is then sent from the cache and forwarded to the application at 304. Note that the data was not retrieved from the storage array in response to the Read request.

Referring specifically to FIG. 2, performance is further enhanced by automatically configuring the host cache 212. In particular, the host 108 includes one or more configuration features such as attaching and detaching specific storage devices to the cache, and assigning a partition 214 within the cache to a specific storage device, or a group of storage devices. In the illustrated embodiment the storage devices which are attached, detached, and assigned partitions are selected ones of logical volumes $200_1$ through $200_n$.

Figure 4:
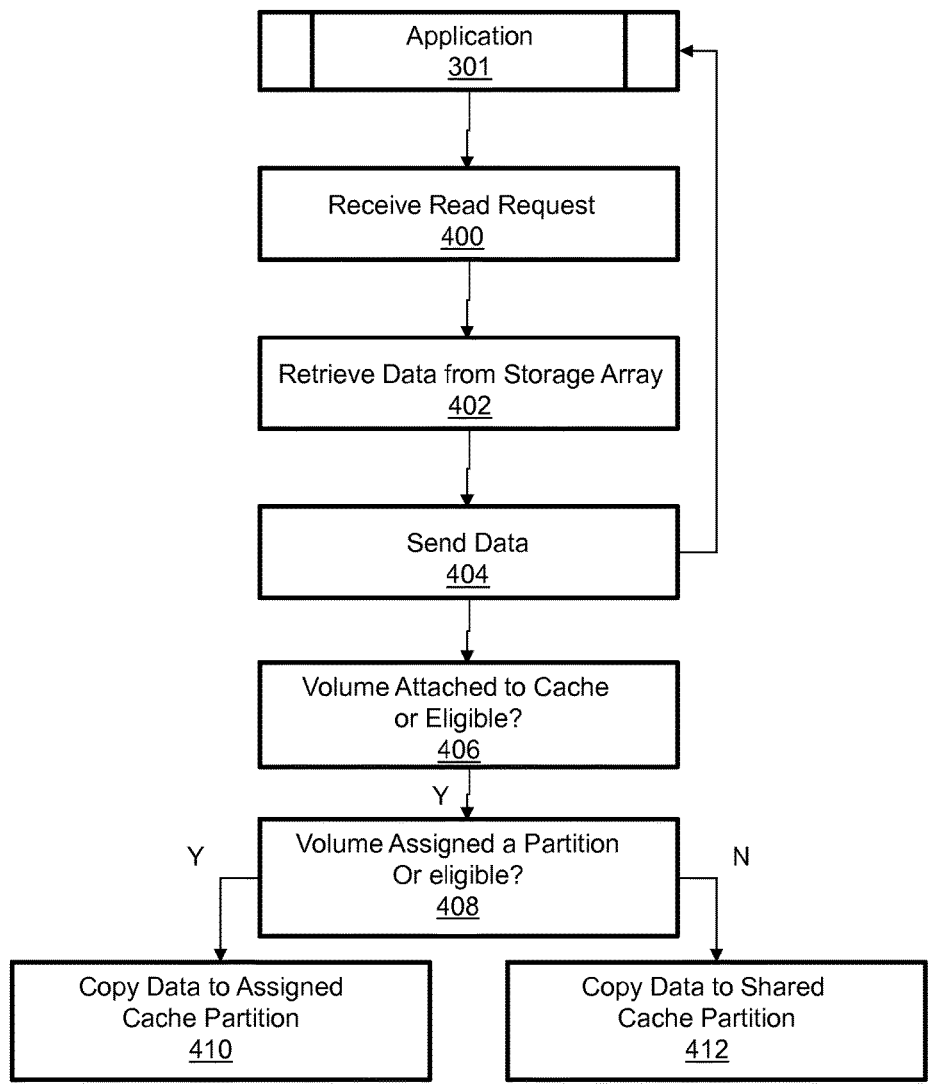
FIG. 4 illustrates a Read Miss with host cache.

FIG. 4 illustrates a host cache Read Miss with reference to the infrastructure of FIGS. 1 and 2. A Read request from an application 301 is received at the host device at 400. A cache driver determines a Read Miss has occurred and accesses data from the storage array at 402. The data is read from the storage array and returned to the application at 404. The Read Miss data may also be asynchronously written to the host cache so that a subsequent request will result in a hit, e.g., a Read Hit as illustrated in FIG. 3. In order to determine whether to write the data to the cache the cache driver determines whether the logical volume on which the data resides is attached to the cache or eligible to be attached at 406. If the logical volume on which the data resides is not attached to the cache or eligible to be attached then no additional action is taken. In the illustrated example logical volume $200_1$ is attached to the cache and logical volume $200_3$ is not attached to the cache. Consequently, data on logical volume $200_1$ would be written to the cache and data on logical volume $200_3$ would not be written to the cache. If the volume is attached to the cache or eligible to be attached then the cache driver determines whether a cache partition is assigned to the volume or the volume is eligible for a partition at 408. If a partition is assigned to the logical volume or the volume is eligible then the data is written to the partition at 410. In the case where the volume is eligible it is first necessary to assign a partition. Otherwise the data is written to a shared partition at 412.

Figure 5:
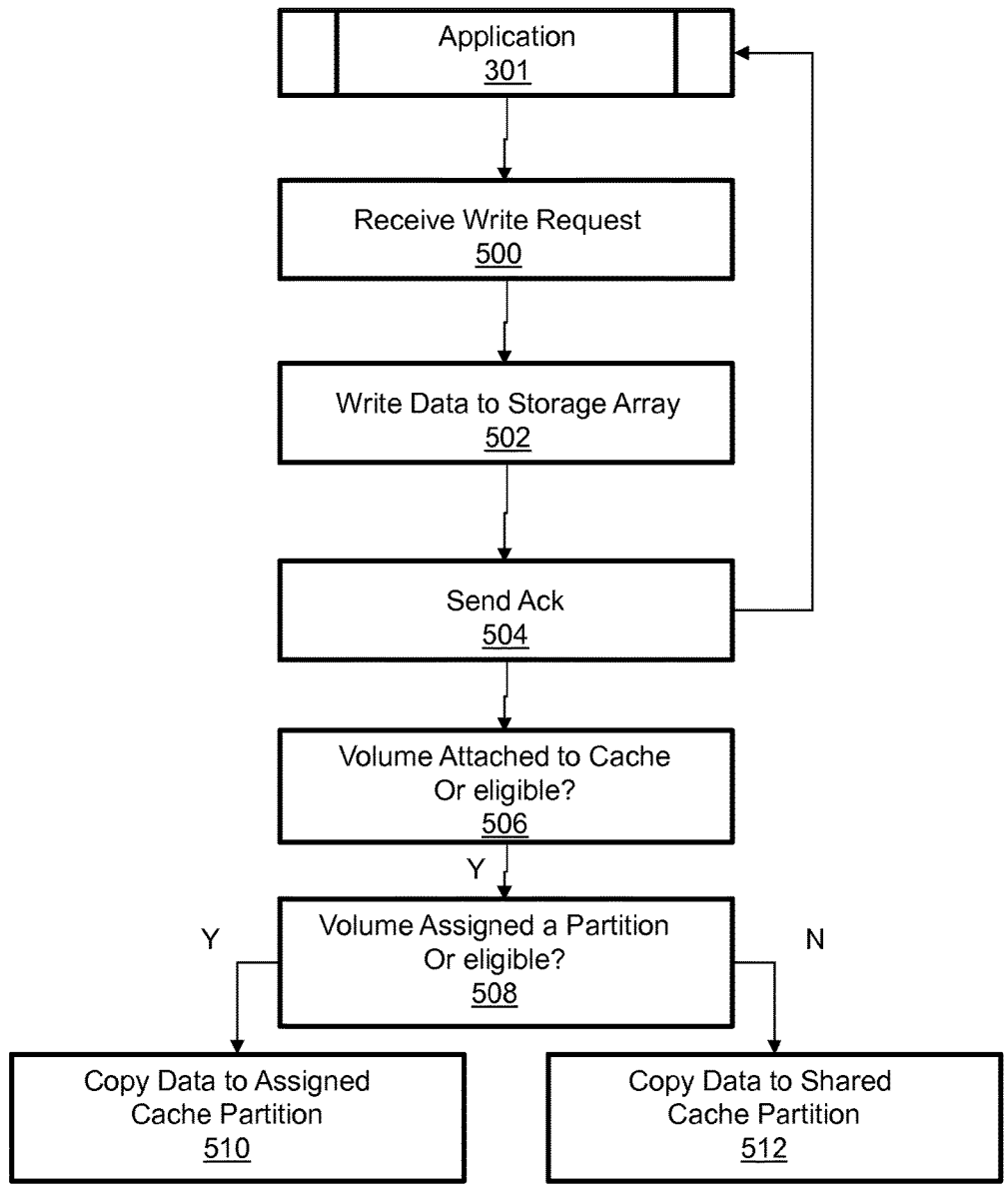
FIG. 5 illustrates a Write with host cache.

FIG. 5 illustrates a Write with reference to the infrastructure of FIGS. 1 and 2. A Write request from an application 301 is received from the application by the host device at 500. The cache driver then writes the data to the storage array at 502. An acknowledgment is sent to the application when the data has been written at 504. The Write data may also be asynchronously written to the host cache. In order to determine whether to write the data to the cache the cache driver determines whether the logical volume on which the data resides is attached to the cache as determined at 506. If the logical volume on which the data resides is not attached to the cache then no additional action is taken. If the volume is attached to the cache then the cache driver determines whether a cache partition is assigned to the volume at 508. If a partition is assigned to the logical volume then the data is written to the partition at 510. Otherwise the data is written to a shared partition at 512.

Figure 6:
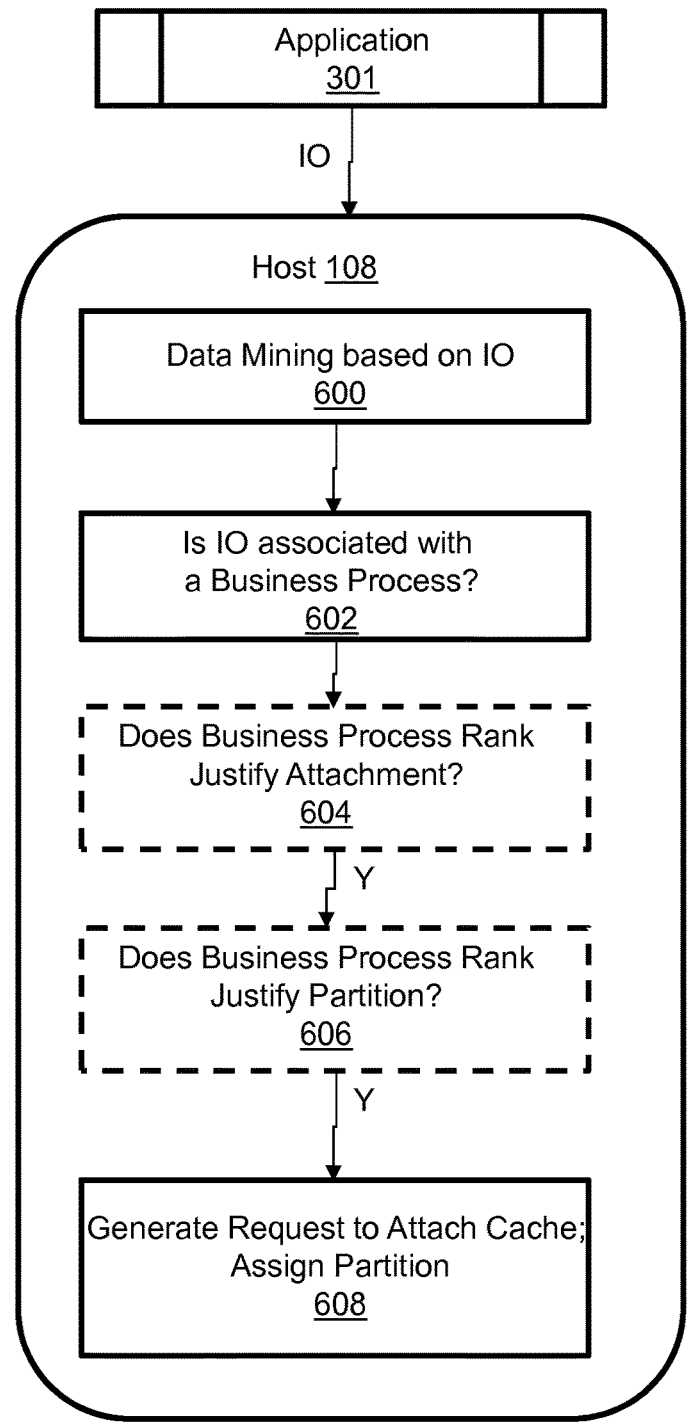
FIG. 6 illustrates host monitoring and analysis.

Referring to FIG. 6, in accordance with one aspect, activity within the host device 108 is monitored and analyzed to determine a configuration for the cache. Available configuration features are then utilized to configure the cache. Various tools exist for monitoring activity within the host machine to support data mining 600. These tools can determine the type of application 301 that is associated with an JO, which specific application is associated with an JO, the device which generated the JO, and other characteristics associated with an JO. The monitoring system is initially configured by defining business processes in terms of at least some of the monitorable characteristics. For example, a business process might include any activity associated with a particular application, or a business process might include a task associated with different applications or types of applications. Monitored characteristics associated with data mining step 600 are used to determine whether an JO is associated with a defined business process at step 602. An optional step 604 is to determine whether the business process has a rank which justifies cache attachment. Each business process may be assigned an indicator of importance, e.g., a priority ranking. The rank of the identified business process may be deemed to justify cache attachment if the cache has free space, the rank exceeds a predetermined threshold, the rank is greater than a rank associated with at least some data already maintained in the cache, or other variations and combinations. Moreover, the rank indicator is not necessarily static, and may be configured to vary over time or in response to other monitorable conditions. Another optional step 606 is to determine whether the rank justifies assigning a partition of the cache for associated data. If ranking is not considered, or if the rank justifies cache attachment, then a request may be generated to attach the cache to the specific device or devices associated with the JO in step 608. The request will indicate assignment of a partition if step 606 is used and a partition is justified. In response to the request, the volume associated with the JO is attached to the cache and corresponding data is copied from the storage array to the cache, e.g., to an assigned partition, as already described above. Consequently, cache configuration is determined based on JO requests, and the configuration can change over time.

A wide variety of algorithms may be used to determine which devices to attach to the cache, whether a partition should be assigned, and partition size. Generally, a device that is used by one or more of the most important (higher ranking) business processes should receive a secured amount of cache. A device that is used by one or more less important (lower ranking) business processes should not receive a secured amount of cache. The number of business processes associated with the device may also be considered. Further, IOs that are not associated with business processes, or which are associated with business processes that will not execute the same JO request several times (e.g., an ETL process, or a backup process) should not be provided a secured amount of cache and may even be excluded from cache attachment so that cache resources are available for other, more important processes and devices.

Aspects of cache configuration and configuration update can be automated. An example of automated cache configuration is utilizing the device attach/detach feature to limit cache use to only those storage devices (host volumes) associated with data of interest. If a specific storage device is associated with a business process, or a business process of a predetermined level of priority according to rank, then that device is eligible to be attached to the cache. Conversely, if a specific storage device is not associated with a business process, or not associated with a business process of a predetermined level of priority according to rank, then that device is eligible to be detached from the cache. In response to an IO request, the monitoring function determines whether the IO request is associated with a business process and, if so, of what priority. The associated storage device is then attached or detached based on eligibility. For example, a first IO request associated with a high priority business process could trigger attachment of the associated storage device. Over time the priority of that business process may change such that it drops below a threshold, after which another IO request now associated with a lower priority (for the same business process) could trigger detachment of the associated storage device. Similarly, lowering of rank over time could cause the attached device data to become eligible for displacement by a device and data associated with a higher ranked business process. Priority ranking can change over time in response to various factors including but not limited to time of day.

Another example of automated cache configuration is utilizing the partition feature to provide preferential treatment to data associated with business processes of sufficient importance. For example, if a specific storage device is associated with a business process having a predetermined level of priority, then that device is assigned a partition of the cache. Conversely, if a specific storage device is not associated with a business process having a predetermined level of priority then that device will share the cache resource with other attached devices. The partition may be created in response to receipt of an IO request associated with the business process having a predetermined level of priority. Further, the size of the partition assigned to the device may be a function of the level of priority of the associated business process. Because priority level can change over time, a subsequent IO received when the business process no longer has the requisite level of priority can trigger termination of the partition. Data associated with a business process which justifies attachment to the cache but not a partition will utilize shared memory space.

As already mentioned, cache configuration is not necessarily static, and may be dynamically updated based on a wide variety of conditions. For example, if a particular business process is not constantly active then the associated storage device may be attached during the active time period and detached during the inactive time period. Further, if the level of priority of a business process changes over time then the associated device may only be assigned a partition when the level of priority or relative priority is sufficient, e.g., relative to an absolute threshold or relative to other business processes. Partition size could also be modified in response to changing level of priority or relative priority.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method comprising:
   in a network comprising a storage array and a host computer, wherein the host computer comprises a flash memory cache, and the storage array comprises physical storage drives on which data is stored, and the data stored on the physical storage drives is presented by the storage array as being stored on logical storage devices:
      associating a first logical storage device of the logical storage devices with a business process;
      responsive to a first IO to the first logical storage device:
         determining that the first IO is associated with the business process;
         responsive to determining that the first IO is associated with the business process, attaching the first logical storage device to the host computer flash memory cache; and
         copying data associated with the first IO from the storage array to the host computer flash memory cache, thereby enabling the data associated with the first IO to be available from the host computer flash memory cache; and responsive to a second IO to a second logical storage device:
determining that the second IO is not associated with the business process; and
responsive to determining that the second IO is not associated with the business process, not attaching the second logical storage device to the host computer flash memory cache.

2. The method of claim 1 wherein associating the first logical storage device of the logical storage devices with the business process comprises defining the business process in terms of monitorable characteristics.

3. The method of claim 2 wherein a plurality of business processes are defined, and comprising assigning an indicator of importance to ones of the business processes.

4. The method of claim 3 wherein attaching the host computer flash memory cache to the first logical storage device is based on the indicator of importance of the business process with which the first IO is associated.

5. The method of claim 1 comprising detaching the first logical storage device from the computer flash memory cache.

6. The method of claim 1 comprising assigning an unshared partition of the host computer flash memory cache to the attached first logical storage.

7. The method of claim 6 including selecting a partition size based on an indicator of importance of the associated business process.

8. The method of claim 6 comprising configuring the host computer flash memory cache with a shared partition.

9. A non-transitory computer readable medium comprising:
in a network comprising a storage array and a host computer, wherein the host computer comprises a flash memory cache, and the storage array comprises physical storage drives on which data is stored, and the data stored on the physical storage drives is presented to the host computer as being stored on logical storage devices:
association logic that associates a first logical storage device of the logical storage devices with a business process;
cache configuration logic responsive to a first IO to the first logical storage device to:
determine that the first IO is associated with the business process;
responsive to determining that the first IO is associated with the business process, attach the first logical storage device to the host computer flash memory cache; and
copy data associated with the first IO from the storage array to the host computer flash memory cache, thereby enabling the data associated with the first IO to be available from the host computer flash memory cache; and
the cache configuration logic being responsive to a second IO to a second logical storage device to:
determine that the second IO is not associated with the business process; and
responsive to determining that the second IO is not associated with the business process, not attach the second logical storage device to the host computer flash memory cache.

10. The computer readable medium of claim 9 including an interface for defining business processes in terms of monitorable characteristics and logic which configures the host computer flash memory cache with a shared partition.

11. The computer readable medium of claim 10 wherein there are multiple business processes and an indicator of importance is assigned to ones of the business processes.

12. The computer readable medium of claim 11 wherein attaching the first logical storage device to the host computer flash memory cache is based on the indicator of importance of the business process with which the first IO is associated.

13. The computer readable medium of claim 9 wherein the cache configuration logic detaches the first logical storage device from the host computer flash memory cache.

14. The computer readable medium of claim 9 wherein the cache configuration logic assigns an unshared partition of the host computer flash memory cache to the attached first logical storage device.

15. The computer readable medium of claim 14 wherein the cache configuration logic selects a partition size based on an indicator of importance of the associated business process.

16. The computer readable medium of claim 14 wherein the cache configuration logic configures the host computer flash memory cache with a shared partition.

17. An apparatus comprising:
a data storage array comprising physical storage drives on which data is stored, the data stored on the physical storage drives being presented externally as being stored on logical storage devices; and
a host device in communication with the data storage array, the host device comprising a flash memory cache and a computer program stored on a non-transitory computer readable medium including:
association logic that associates a first logical storage device of the logical storage devices with a business process;
cache configuration logic responsive to a first IO to the first logical storage device to:
determine that the first IO is associated with the business process;
responsive to determining that the first IO is associated with the business process, attach the first logical storage device to the host computer flash memory cache; and
copy data associated with the first IO from the storage array to the host computer flash memory cache, thereby enabling the data associated with the first IO to be available from the host computer flash memory cache; and
the cache configuration logic being responsive to a second IO to a second logical storage device to:
determine that the second IO is not associated with the business process; and
responsive to determining that the second IO is not associated with the business process, not attach the second logical storage device to the host computer flash memory cache.

18. The apparatus of claim 17 comprising an interface for defining business processes in terms of monitorable characteristics.

19. The apparatus of claim 18 wherein there are a plurality of business processes, and wherein the interface also enables assigning an indicator of importance to ones of the business processes.

20. The apparatus of claim 19 wherein the cache configuration logic attaches the first logical storage device to the host computer flash memory cache based on the indicator of importance of the business process with which the first IO is associated.

21. The apparatus of claim 17 wherein the cache configuration logic detaches the first logical storage device from the host computer flash memory cache.

22. The apparatus of claim 17 wherein the cache configuration logic assigns an unshared partition of the host computer flash memory cache to the attached first logical storage device.

23. The apparatus of claim 22 wherein the cache configuration logic selects a partition size based on an indicator of importance of the associated business process.

24. The apparatus of claim 17 wherein the cache configuration logic configures the host computer flash memory cache with a shared partition.

* * * * *